(12) United States Patent
Izawa

(10) Patent No.: US 7,883,141 B2
(45) Date of Patent: Feb. 8, 2011

(54) VEHICLE BODY STRUCTURE

(75) Inventor: Naohisa Izawa, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 267 days.

(21) Appl. No.: 11/988,088

(22) PCT Filed: Jul. 24, 2006

(86) PCT No.: PCT/JP2006/314576
§ 371 (c)(1),
(2), (4) Date: Jul. 24, 2008

(87) PCT Pub. No.: WO2007/018032
PCT Pub. Date: Feb. 15, 2007

(65) Prior Publication Data
US 2009/0058139 A1    Mar. 5, 2009

(30) Foreign Application Priority Data
Aug. 8, 2005    (JP) ............................ 2005-229199

(51) Int. Cl.
B60R 13/07    (2006.01)
B60H 1/28    (2006.01)
(52) U.S. Cl. .................................... 296/192
(58) Field of Classification Search ............. 296/70, 296/96.21, 190.1, 192, 201, 208
See application file for complete search history.

(56) References Cited

U.S. PATENT DOCUMENTS

| | | | | |
|---|---|---|---|---|
| 4,721,032 A * | 1/1988 | Sakamoto | ............... | 454/146 |
| 4,819,550 A * | 4/1989 | Ioka | ............... | 454/147 |
| 6,565,148 B1 * | 5/2003 | Teramoto et al. | ............... | 296/192 |
| 6,633,089 B2 * | 10/2003 | Kimura | ............... | 307/10.1 |
| 2003/0107243 A1 * | 6/2003 | Hayashi | ............... | 296/192 |
| 2010/0187862 A1 * | 7/2010 | Kurata et al. | ............... | 296/192 |

FOREIGN PATENT DOCUMENTS

| | | | |
|---|---|---|---|
| EP | 99115 A2 * | 1/1984 |
| EP | 288770 A2 * | 11/1988 |
| FR | 2623455 A1 * | 5/1989 |
| FR | 2710009 A1 * | 3/1995 |
| JP | 58218474 A * | 12/1983 |
| JP | 61075065 A * | 4/1986 |
| JP | 01041416 A * | 2/1989 |

(Continued)

Primary Examiner—Glenn Dayoan
Assistant Examiner—Paul A Chenevert
(74) Attorney, Agent, or Firm—Birch, Stewart, Kolasch & Birch, LLP

(57) ABSTRACT

A vehicle body structure capable of reliably preventing water intrusion into an engine room is provided. For that purpose, there is provided a deck garnish (4), which is disposed so as to occlude a space between an upper surface of a lower part of a windshield (2) and a lower surface of a rear part of an engine hood (3) of a vehicle (1), and which extends in a vehicle width direction. On this front deck garnish (4), formed are: a stepped portion (42) inclined toward a front side of a vehicle body at a lower rear end of the engine hood (3); and drain grooves (43) formed at a front end of the stepped portion (42) so as to have a bag-shaped cross section and configured to communicate with a bottom portion of a deck panel (5).

14 Claims, 3 Drawing Sheets

FOREIGN PATENT DOCUMENTS

| | | | |
|---|---|---|---|
| JP | 2-38809 | | 10/1990 |
| JP | 2-139108 | | 11/1990 |
| JP | 3-73273 | | 7/1991 |
| JP | 04090977 A | * | 3/1992 |
| JP | 06080012 A | * | 3/1994 |
| JP | 7-21426 | | 5/1995 |
| JP | 08020293 A | * | 1/1996 |
| JP | 8-142913 A | | 6/1996 |
| JP | 08142653 A | * | 6/1996 |
| JP | 2555026 | | 8/1997 |
| JP | 2852258 B2 | | 11/1998 |
| JP | 2000-1177 A | | 1/2000 |
| JP | 2000-72038 A | | 3/2000 |
| JP | 2001-97244 A | | 4/2001 |
| JP | 2001-278117 A | | 10/2001 |

* cited by examiner

[FIG.1]
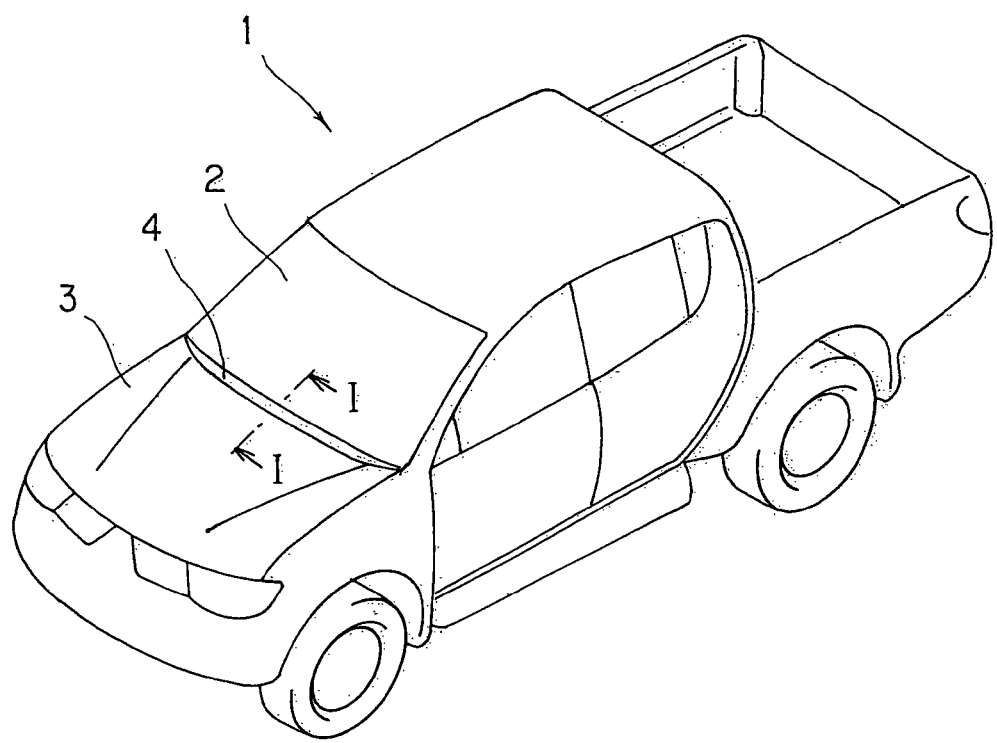

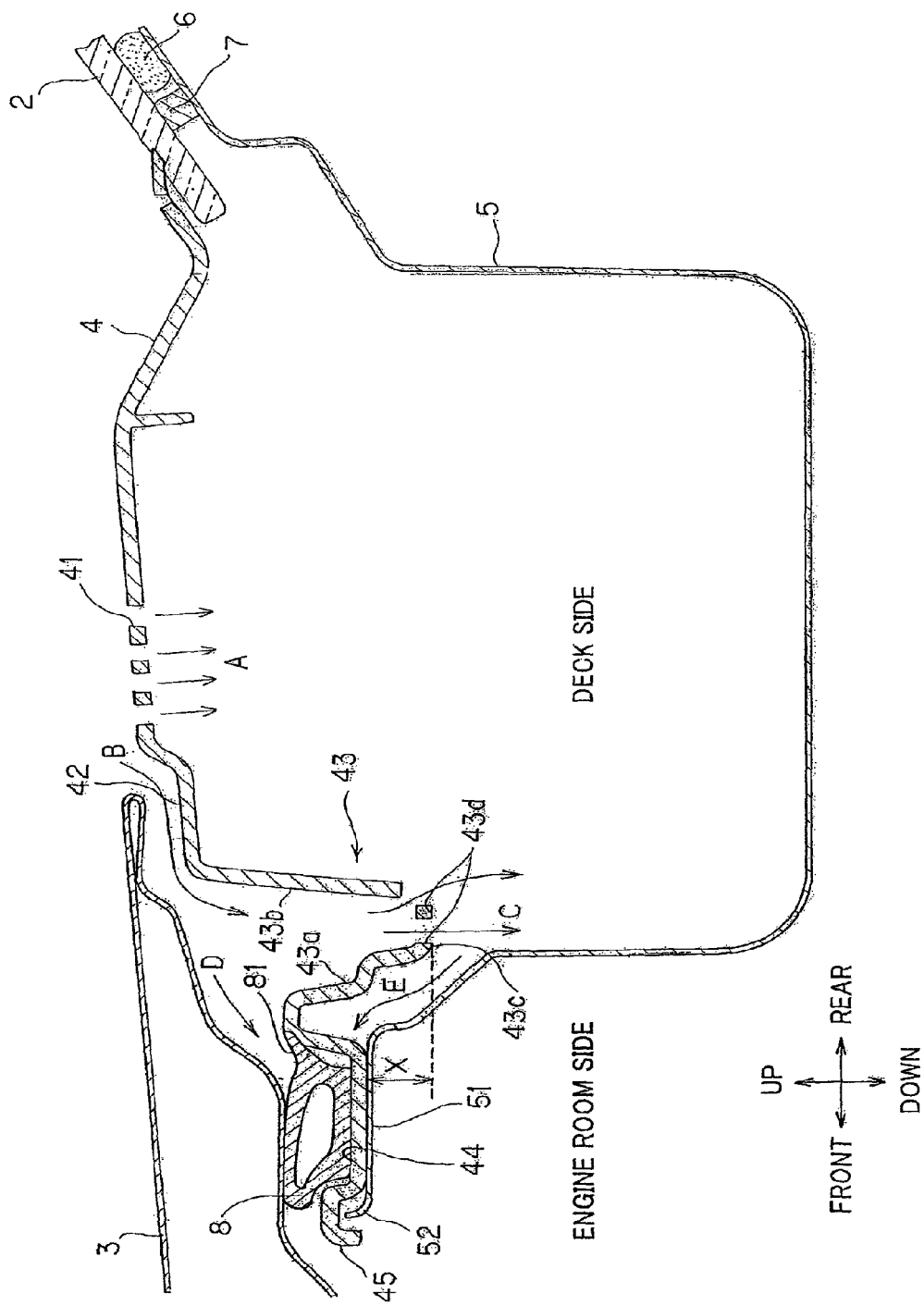
[FIG.2]

[FIG.3]
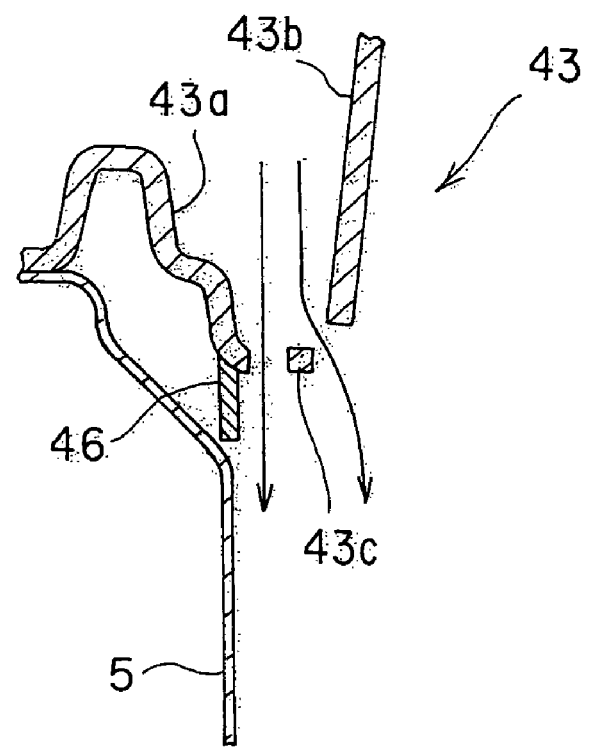

VEHICLE BODY STRUCTURE

BACKGROUND OF THE INVENTION

1. Field of the Invention

The present invention relates to a vehicle body structure including a water intrusion prevention structure for preventing intrusion, into an engine room, of rain water or the like that flows in from a vent hole of a front deck garnish.

2. Description of the Related Art

In general, a vehicle is provided with a front deck garnish for occluding a space between a windshield and an engine hood. One end of this front deck garnish supports a lower end of the windshield together with a deck panel whereas the other end is supported by the deck panel below the engine hood. Meanwhile, a vent hole for taking in outside air is formed in the front deck garnish, and the outside air taken into this vent hole passes through an air intake duct and is guided into a vehicle interior. In this way, the outside air is taken into the vehicle interior even when windows are closed for blocking wind noises at the time of driving at high speed or noises outside the vehicle.

Meanwhile, at the time of raining or at the time of washing the vehicle, the water that flows into the space between the windshield and the engine hood rolls down on the front deck garnish to the side of the vehicle, while the water intruding into the vent hole rolls down to a bottom section of the deck panel and is discharged out of the vehicle. At this time, although the water intrudes through the vent hole, a weatherstrip for hermetically sealing the space with the engine hood is provided at a front end of the deck panel, and the flow can be held back by the weatherstrip. Accordingly, it is possible to prevent water intrusion into the engine room.

Such a conventional vehicle body structure is disclosed, for example, in JP-A 2000-1177.

DISCLOSURE OF THE INVENTION

Problems to be Solved by the Invention

However, the conventional vehicle body structure prevents water intrusion into the engine room only by use of the weatherstrip, which is insufficient as a water intrusion prevention structure. Moreover, when the engine hood is closed, the weatherstrip is pressed with a predetermined pressure and is therefore easily degradable, and the waterproof performance may be reduced consequently. In this way, if water intrudes into the engine room, there is a risk of adverse effects on electric components such as a battery.

Therefore, the present invention is intended to solve the foregoing problems and has an object to provide a vehicle body structure which is capable of reliably preventing water intrusion into an engine room by providing a water intrusion prevention structure stepwise.

SUMMARY OF THE INVENTION

A vehicle body structure, according to a first aspect of the invention for solving the problems, includes a deck garnish extending in a vehicle width direction and being disposed so as to occlude a space between an upper surface of a lower part of a windshield and a lower surface of a rear part of an engine hood of a vehicle. This deck garnish includes: a stepped portion inclined toward a front side of a vehicle body at a lower rear end of the engine hood; and a drain groove formed at a front end of the stepped portion so as to have a bag-shaped cross section and configured to communicate with a bottom portion of a vehicle body member.

A vehicle body structure according to a second aspect of the invention for solving the problems is the vehicle body structure according to the first aspect of the invention, wherein a concave fitting configured to fit a weatherstrip for occluding the space with the engine hood is formed on the drain groove on the front side of the vehicle body, and that a waterproof lip to be connected to a rear end of the fitting is provided on the weatherstrip.

A vehicle body structure according to a third aspect of the invention for solving the problems is the vehicle body structure according to the second aspect of the invention, wherein the fitting is bonded to a flange portion of the vehicle body member, and that joint surfaces of the fitting and the flange portion are located higher than a drain outlet of the drain groove.

A vehicle body structure according to a fourth aspect of the invention for solving the problems is the vehicle body structure according to any of the second and third aspects of the invention[s], wherein a convex rib is formed at a front end of the fitting.

A vehicle body structure according to a fifth aspect of the invention for solving the problems is the vehicle body structure according to any of the third and fourth aspects of the invention[s], wherein a protrusion protruding upward is formed at a front end of the flange portion.

A vehicle body structure according to a sixth aspect of the invention for solving the problems is the vehicle body structure according to any of the first to fifth aspects of the invention[s], wherein a waterwall is provided at a lower end of the drain groove on the front side of the vehicle body.

EFFECTS OF THE INVENTION

According to the vehicle body structure of the first aspects of the invention, there is provided the deck garnish, which is disposed so as to occlude the space between the upper surface of the lower part of the windshield and the lower surface of the rear part of the engine hood of a vehicle, and which extends in the vehicle width direction. The deck garnish includes: the stepped portion inclined toward the front side of the vehicle body at the lower rear end of the engine hood; and the drain groove formed at the front end of the engine hood so as to have the bag-shaped cross section and configured to communicate with the bottom portion of the vehicle body member. Hence it is possible to prevent water intrusion into the engine room reliably.

According to the vehicle body structure of the second aspect of the invention, in the vehicle body structure of the first aspect of the invention, the concave fitting configured to fit the weatherstrip for occluding the space with the engine hood is formed on the drain groove on the front side of the vehicle body and the waterproof lip to be connected to the rear end of the fitting is provided on the weatherstrip. Hence it is possible to prevent the weatherstrip from being directly hit by the water.

According to the vehicle body structure of the third aspect of the invention, in the vehicle body structure of the second invention, the fitting is bonded to the flange portion of the vehicle body member and the joint surfaces of the fitting and the flange portion are located higher than the drain outlet of the drain groove. Hence it is possible to prevent intrusion the water discharged from the drain outlet into the engine room through the space between the fitting and the flange portion.

According to the vehicle body structure of the fourth aspect of the invention, in the vehicle body structure of the second or third aspect of the invention, the convex rib is formed at the front end of the fitting. Hence it is possible to prevent an inflow of the water intruding the fitting into the engine room.

According to the vehicle body structure of the fifth aspect of the invention, in the vehicle body structure of the third or fourth aspect of the invention, the protrusion protruding upward is formed at the front end of the flange portion. Hence it is possible to prevent water intrusion into the engine room.

According to the vehicle body structure of the sixth aspect of the invention, in the vehicle body structure of any of the first to fifth aspects of the invention [s], the waterwall is provided on the lower end of the drain groove on the front side of the vehicle body. Hence it is possible to prevent water intrusion into the engine room.

BRIEF DESCRIPTION OF THE DRAWINGS

FIG. 1 is a perspective view of a vehicle.
FIG. 2 is a cross-sectional view taken along the I-I arrow line in FIG. 1, which is a schematic diagram showing a vehicle body structure according to an embodiment of the present invention.
FIG. 3 is a view showing a layout position of a waterwall.

DETAILED DESCRIPTION OF THE INVENTION

Now, a vehicle body structure according to the present invention will be described in detail by using the drawings. FIG. 1 is a perspective view of a vehicle. FIG. 2 is a cross-sectional view taken along the I-I arrow line in FIG. 1, which is a schematic diagram showing a vehicle body structure according to an embodiment of the present invention. FIG. 3 is a view showing a layout position of a waterwall. Here, arrows in the drawings indicate streams of water.

As shown in FIG. 1, a vehicle 1 is provided with a windshield 2 and an engine hood 3, and a front deck garnish 4 is provided in a space between this windshield 2 and the engine hood 3.

As shown in FIG. 2, a deck panel (a vehicle body member) 5 is provided below the front deck garnish 4. A rear end of the front deck garnish 4 covers a front end of the windshield 2 over the entire area in a vehicle width direction. Meanwhile, a rear end of the deck panel 5 fixes the front end of the windshield 2 from below with an adhesive 6. Here, the adhesive 6 is stemmed by a dam member 7. Specifically, the front deck garnish 4 and the front end of the deck panel are bonded together below the engine hood 3; meanwhile, the front deck garnish 4 and the rear end of the deck panel 5 support the front end of the windshield 2 so as to sandwich it from upper and lower directions. Moreover, a weatherstrip 8 is provided at a front end of the front deck garnish 4 so as to seal a space with the engine hood 3 hermetically.

Here, an engine room for housing an unillustrated engine is provided below the engine hood 3, and a position below the front deck garnish 4 and the front end of the deck panel 5 will be indicated as an engine room side. Meanwhile, a space defined by the front deck garnish 4 and the deck panel 5 will be indicated as a deck side.

Vent holes 41 opened at a substantially constant interval in the vehicle width direction are formed in multiple lines at a substantially central part in a front-and-rear direction of the vehicle body of the front deck garnish 4. These vent holes 41 are configured to take in outside air into a vehicle interior, and the outside air taken in from the vent holes 41 is suctioned into the vehicle interior through an unillustrated air intake duct provided below the vent holes 41. Moreover, a stepped portion 42 is formed below a rear end of the engine hood 3 on a front side of these vent holes 41 in the vehicle body. A surface of the stepped portion 42 is located lower than a plane where the vent holes 41 are formed and is gently inclined from the rear side toward the front side of the vehicle body.

A drain groove 43 to be disposed on the deck side is provided at a front end of the stepped portion 42, and a cross-section of this drain groove 43 is formed into a bag shape over the entire area in the vehicle width direction. Moreover, the drain groove 43 includes: an inclined wall 43a provided on the front side of the vehicle body; a vertical wall 43b provided on the rear side of the vehicle body; and a bottom portion 43c provided at a lower part. The inclined wall 43a extends inclinedly from the front side toward the back side of the vehicle body; meanwhile, the vertical wall 43b extends substantially in the vertical direction from the front end of the stepped portion 42 downward and the height thereof in the vertical direction of the vehicle body is formed higher than the height of the inclined wall 43a. Moreover, two lines of drain outlets 43d communicating to the deck side are formed in the front-and-rear direction of the vehicle body on the bottom portion 43c with provision of a substantially constant interval in the vehicle width direction.

In addition, a fitting 44, which have a concave shape and a fitting surface serving as a bottom face that is substantially horizontal, is formed on the front side of the vehicle body of the drain groove 43, and a convex rib 45 is formed on a front end of the fitting 44. The weatherstrip 8 is fitted to this fitting surface of the fitting 44, and a waterproof lip 81 to be provided on one end of the weatherstrip 8 is fixed to a rear end of the fitting 44 (the front end of the drain groove 43). Moreover, a flange portion 51 of the deck panel 5 is joined to a lower surface of the fitting 44 and a protrusion 52 is formed on a front end of the flange portion 51. This protrusion 52 is curved from the front end of the flange portion 51 and extends upward and a tip end thereof is disposed below the rib 45. Here, a layout position of joint surfaces of the fitting 44 and the flange portion 51 is located higher, in the vertical direction of the vehicle body, than a layout position of the bottom portion 43a of the drain groove 43. This difference in the height will be indicated as a step X.

Accordingly, by constructing the above-described configuration, water, which flows into the space between the windshield 2 and the engine hood 3 at the time of raining or at the time of washing the vehicle, may partially flow into the vent holes 41 of the front deck garnish 4 as indicated by arrows A in FIG. 2, and may partially flow in a space between the rear end of the engine hood 3 and the front deck garnish 4 as indicated by an arrow B.

As indicated by the arrows A, the water flowing into the vent holes 41 of the front deck garnish 4 runs down to the bottom portion of the deck panel 5 and is guided by an unillustrated drain passage and discharged out of the vehicle.

On the other hand, as indicated by the arrow B, the water, which flows into the space between the rear end of the engine hood 3 and the front deck garnish 4, firstly passes through the stepped portion 42 so as to reduce a force of that flow, and which is allowed to flow into the drain groove 43 as indicated by the arrow C. The water, which flows into the drain groove 43, runs along the inclined wall 43a and the vertical wall 43b down to the bottom portion 43c, and is discharged from the drain outlets 43d. Thereafter, the water, which is discharged from the drain outlets 43d, runs down to the bottom portion of the deck panel 5 in the same manner as the water flowing into the vent holes 41 of the front deck garnish 4, is guided to the drain passage, and is discharged out of the vehicle. In this way, it is possible to prevent the water from flowing into the space between the engine hood 3 and the front end of the front deck garnish 4 as indicated by an arrow D. In other words, it is possible to prevent water intrusion into the engine room side.

In case when the water having the force not reduced during passage of the stepped portion 42 flows toward the engine room side as indicated by the arrow D, it is possible to block the flow by use of the weatherstrip 8. In addition, the weatherstrip 8 is provided with the waterproof lip 81. Accordingly, it is possible to suppress the water to hit the weatherstrip 8 directly, to protect a joint between the weatherstrip 8 and the fitting 44, and thereby to prevent degradation. Further, in case of water intrusion into the fitting 44, it is possible to prevent water intrusion into the engine room reliably because the rib 45 is formed at the front end of the fitting 44.

Meanwhile, the drain outlets 43d are formed in a lower position than the joint of the fitting 44 and the flange portion 51 in the amount equivalent to the step X. Thus, the water discharged from the drain outlets 43d, as indicated by the arrow E, will not flow into the space between the fitting 44 and the flange portion 51, and will not intrude into the engine room. Even if the water intrudes into the space, it is possible to prevent water intrusion into the engine room reliably because the protrusion 52 is formed.

Here, in the case where it is not possible to provide the step X in a sufficient way to prevent water intrusion, it is also possible to provide a waterwall 46, as shown in FIG. 3, in the vicinity of a lower end of the inclined wall 43, i.e. on the front side of the vehicle body of the drain outlets 43d so as to extend over the entire area in the vehicle width direction of the front deck garnish 4. In this way, it is possible to prevent water from intruding into the space between the fitting 44 and the flange portion 51.

Therefore, according to the vehicle body structure of the present invention, there is provided the deck garnish 4, which is disposed so as to occlude the space between the upper surface of the lower part of the windshield 2 and the lower surface of the rear part of the engine hood 3 of the vehicle 1, and which extends in the vehicle width direction. On this front deck garnish 4, formed are: the stepped portion 42 inclined toward the front side of the vehicle body at the lower rear end of the engine hood 3; and the drain grooves 43 formed at the front end of the stepped portion 42 so as to have the bag-shaped cross section, and configured to communicate with the bottom portion of the deck panel 5. Hence it is possible to provide the water intrusion prevention structure stepwise, and to reliably prevent water intrusion into the engine room.

Moreover, by forming the concave fitting 44 for fitting the weatherstrip 8 configured to occlude the space with the engine hood 3 on the front side of the vehicle body of the drain groove 43 and by providing the weatherstrip 8 with the concave fitting 44 to be connected to the rear end of the fitting 44, it is possible to prevent the water from directly hitting the weatherstrip 8 and to protect the joint between the weatherstrip 8 and the fitting 44. Accordingly, it is possible to avoid degradation of the weatherstrip 8. Moreover, even if the water intrudes into the fitting 44, it is possible to reliably prevent the water that intrudes into the fitting 44 from running down into the engine room.

Meanwhile, by joining the fitting 44 to the flange portion 51 and by disposing the joint surfaces of the fitting 44 and the flange portion 511 higher than the drain outlets 43d of the drain groove 43 in the amount equivalent to the step X, it is possible to prevent the water discharged from the drain outlets 43d from passing through the space between the fitting 44 and the flange portion 51, and from intruding into the engine room. Moreover, even if the water intrudes into the space between the fitting 44 and the flange portion 51, it is possible to reliably prevent water intrusion into the engine room because the protrusion 52 that protrudes upward is formed on the front end of the flange portion 51.

In addition, when it is not possible to provide the step X in a sufficient way to prevent water intrusion, it is still possible to prevent water intrusion into the engine room by providing the waterwall 46 on the front side of the vehicle body of the drain outlets 43d.

INDUSTRIAL APPLICABILITY

The invention is applicable to a water intrusion prevention structure for preventing water intrusion from a vent hole.

The invention claimed is:

1. A vehicle body structure, comprising:
    a deck garnish extending in a vehicle width direction, and being disposed to occlude a space between an upper surface of a lower part of a windshield of a vehicle and a lower surface of a rear part of an engine hood of the vehicle,
    the deck garnish including,
    a stepped portion inclined toward a front side of a vehicle body below a rear end of the engine hood,
    a drain groove formed at a front end of the stepped portion to have a bag-shaped cross section, and configured to communicate with a bottom portion of a vehicle body member,
    a fitting formed on the drain groove on the front side of the vehicle body, and
    a weatherstrip fitted on the fitting for occluding a space defined between the fitting and the engine hood.

2. The vehicle body structure according to claim 1, wherein the fitting has a concave shape.

3. A vehicle body structure, comprising:
    a deck garnish extending in a vehicle width direction, and being disposed so as to occlude a space between an upper surface of a lower part of a windshield of a vehicle and a lower surface of a rear part of an engine hood of the vehicle,
    the deck garnish including,
    a stepped portion inclined toward a front side of a vehicle body below a rear end of the engine hood;
    a drain groove formed at a front end of the stepped portion so as to have a bag-shaped cross section, and configured to communicate with a bottom portion of a vehicle body member; and
    a concave fitting configured to fit a weatherstrip for occluding the space with the engine hood, the concave fitting being formed on the drain groove on the front side of the vehicle body.

4. The vehicle body structure according to claim 3, further comprising:
    a waterwall provided at a lower end of the drain groove on the front side of the vehicle body.

5. The vehicle body structure according to claim 3, wherein the weatherstrip has a waterproof lip to be connected to a rear end of the fitting.

6. The vehicle body structure according to claim 5, further comprising:
    a waterwall provided at a lower end of the drain groove on the front side of the vehicle body.

7. The vehicle body structure according to claim 5, wherein a convex rib is formed at a front end of the fitting.

8. The vehicle body structure according to claim 7, wherein a protrusion protruding upward is formed at a front end of the flange portion.

9. The vehicle body structure according to claim 7, further comprising:
a waterwall provided at a lower end of the drain groove on the front side of the vehicle body.

10. The vehicle body structure according to claim 5,
wherein the fitting is bonded to a flange portion of the vehicle body member, and
joint surfaces of the fitting and the flange portion are located higher than a drain outlet of the drain groove.

11. The vehicle body structure according to claim 5,
wherein a convex rib is formed at a front end of the fitting.

12. The vehicle body structure according to claim 10, further comprising:
a waterwall provided at a lower end of the drain groove on the front side of the vehicle body.

13. The vehicle body structure according to claim 5,
wherein a protrusion protruding upward is formed at a front end of the flange portion.

14. The vehicle body structure according to claim 13, further comprising:
a waterwall provided at a lower end of the drain groove on the front side of the vehicle body.

* * * * *